US012580864B2

(12) United States Patent

Philip et al.

(10) Patent No.: US 12,580,864 B2

(45) Date of Patent: Mar. 17, 2026

(54) INTER-CLUSTER HIERARCHICAL ROUTING WITH MULTIPLE PATHS FOR LOAD BALANCING

(71) Applicant: Baya Systems, Inc., Santa Clara, CA (US)

(72) Inventors: Joji Philip, San Jose, CA (US); Eric Norige, Santa Clara, CA (US); James Aldis, Northampton (GB); Honnahuggi Harinath Venkata Naga Ambica Prasad, Bengaluru (IN); Jatinkumar Vithalbhai Fultaria, Bengaluru (IN)

(73) Assignee: BAYA SYSTEMS, INC., Santa Clara, CA (US)

( * ) Notice: Subject to any disclaimer, the term of this patent is extended or adjusted under 35 U.S.C. 154(b) by 14 days.

(21) Appl. No.: 18/775,950

(22) Filed: Jul. 17, 2024

(65) Prior Publication Data

US 2025/0373553 A1    Dec. 4, 2025

(30) Foreign Application Priority Data

May 31, 2024    (IN) .............................. 202411042618

(51) Int. Cl.
*H04L 47/125* (2022.01)
*H04L 45/7453* (2022.01)
*H04L 49/109* (2022.01)

(52) U.S. Cl.
CPC ........ *H04L 47/125* (2013.01); *H04L 45/7453* (2013.01); *H04L 49/109* (2013.01)

(58) Field of Classification Search
CPC ........... G06F 15/17362; G06F 15/7807; H04L 47/125; H04L 45/7453; H04L 49/109
See application file for complete search history.

(56) References Cited

U.S. PATENT DOCUMENTS

2010/0191911 A1* 7/2010 Heddes .................. G06F 15/16
                                                       711/E12.091
2011/0063979 A1* 3/2011 Matthews ............... H04L 69/14
                                                       370/237

(Continued)

FOREIGN PATENT DOCUMENTS

WO      WO-2025113366 A1 *  6/2025  .......... H04W 52/241

OTHER PUBLICATIONS

M. Xiang and T. H. Teo, "A Multi-scale Binarized Neural Network Application Based on All Programmable System on Chip," 2021 IEEE 14th International Symposium on Embedded Multicore/Many-core Systems-on-Chip (MCSoC), Singapore, Singapore, 2021, pp. 151-156 (Year: 2021).*

(Continued)

*Primary Examiner* — Messeret F Gebre

(74) *Attorney, Agent, or Firm* — Procopio, Cory, Hargreaves & Savitch LLP

(57) ABSTRACT

A method for load balancing flows of a Network on Chip (NoC) having a plurality of routers and a plurality of bridges arranged into a plurality of clusters described herein includes receiving packets at the NoC, the packet being associated with a target destination as specified by a cluster identifier and a local identifier. For receipt of each packet, the method includes routing the packet to a destination in the NoC according to the local identifier for the NoC having a same cluster identifier as the cluster identifier associated with the packet, and routing the packet according to a route lookup from referencing the cluster identifier and a path identifier associated with the packet for the NoC having a different cluster identifier from the cluster identifier associated with the packet.

13 Claims, 10 Drawing Sheets

(56) References Cited

U.S. PATENT DOCUMENTS

| | | | | |
|---|---|---|---|---|
| 2017/0220520 | A1* | 8/2017 | Meyer | G06F 15/17362 |
| 2017/0351555 | A1* | 12/2017 | Coffin | G06F 9/5083 |
| 2024/0073131 | A1* | 2/2024 | Stan | H04L 43/50 |

OTHER PUBLICATIONS

R. Poovendran, S. Billclinton., R. Darshan., R. Dinakar. and M. Fazil., "Design and analysis of a mesh-based Adaptive Wireless Network-on Chips Architecture With Irregular Network Routing," 2019 , Pondicherry, India (Year: 2019).*

* cited by examiner

100B

200

| Destination Local ID | Local Routes |
|---|---|
| 0 | Local Route 0 |
| 1 | Local Route 1 |
| 2 | Local Route 2 |
| ∘ ∘ ∘ | ∘ ∘ ∘ |
| N | Local Route N |

First Table

400A

400B

| Destination Cluster ID | Path ID | Routes |
|---|---|---|
| 0 | 0 | Route 0 |
| 0 | 1 | Route 1 |
| 0 | 2 | Route 2 |
| 0 | 3 | Route 3 |
| 1 | 0 | Route 4 |
| 1 | 1 | Route 5 |
| o o o | o o o | o o o |
| N | M | Route NM |

Second Table

FIG. 4(b)

INTER-CLUSTER HIERARCHICAL ROUTING WITH MULTIPLE PATHS FOR LOAD BALANCING

CROSS-REFERENCE TO RELATED APPLICATIONS

This application claims priority to IN 202411042618, filed on May 31, 2024, the contents of which are incorporated herein by reference.

BACKGROUND

Technical Field

Methods and example embodiments described herein are generally directed to width adaption converter for communication between routers of a Network on Chip (NoC).

Related Art

The number of components on a chip is rapidly growing due to increasing levels of integration, system complexity, and shrinking transistor geometry. Complex System-on-Chips (SoCs) may involve a variety of components e.g., processor cores, Digital Signal Processors (DSPs), hardware accelerators, memory, and Input/Output (I/O) subsystems, while Chip Multi-Processors (CMPs) may involve a large number of homogenous processor cores, memory, and I/O subsystems. In both systems, the on-chip interconnect plays a key role in providing high-performance communication between the various components. Due to scalability limitations of traditional buses and crossbar-based interconnects, Network-on-Chip (NoC) has emerged as a paradigm to interconnect a large number of components on the chip.

NoC is a global shared communication infrastructure made up of several routing nodes interconnected with each other using point-to-point physical links. Messages are injected by the source component and are routed from the source component to the destination component over multiple intermediate nodes and physical links. The messages are then ejected to the destination component. For the remainder of the document, the terms 'processing elements,' 'components,' 'blocks,' 'hosts,' or 'cores' will be used interchangeably to refer to the various system components which are interconnected using a NoC. The terms 'routers' and 'nodes' will also be used interchangeably. Without loss of generalization, the system with multiple interconnected components will itself be referred to as 'multi-core systems.'

There are several possible topologies in which the routers can connect to one another to create the system network. Bi-directional rings 100A (as shown in FIGS. 1(*a*)) and 2-D mesh 100B (as shown in FIG. 1(*b*)) are examples of topologies in the related art.

Packets are message transport units for intercommunication between various components. Routing involves identifying a path which is a set of routers and physical links of the network over which packets are sent from a source to a destination. Components are connected to one or multiple ports of one or multiple routers; with each such port having a unique identifier (ID). Packets carry the destination's router and port ID for use by the intermediate routers to route the packet to the destination component.

Examples of routing techniques include deterministic routing, which involves choosing the same path from A to B for every packet. This form of routing is oblivious of the state of the network and does not load balance across path diversities which may exist in the underlying network. However, such deterministic routing may be simple to implement in hardware, maintain packet ordering, and may be easy to make free of network level deadlocks. Shortest path routing minimizes the latency as it reduces the number of hops from the source to the destination. For this reason, the shortest path is also the lowest power path for communication between the two components. Dimension-order routing is a form of deterministic shortest path routing in 2D mesh networks.

FIG. 2 illustrates an example of XY routing 200 in a two-dimensional mesh. More specifically, FIG. 2 illustrates XY routing from node '34' to node '00.' In the example of FIG. 2, each component is connected to only one port of one router. A packet is first routed in the X dimension till the packet reaches node '04' where the X dimension is same as destination. The packet is next routed in the Y dimension until the packet reaches the destination node.

Source routing and routing using tables are other routing options used in NoC. Adaptive routing can dynamically change the path taken between two points on the network based on the state of the network. This form of routing may be complex to analyze and implement, and is therefore, rarely used in practice.

A NoC may contain multiple physical networks. Over each physical network, there may exist multiple virtual networks, wherein messages (of same or different types) are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects often employ wormhole routing, wherein, a large message or packet is broken into small pieces known as flits (also referred to as flow control units). The first flit is the header flit which holds information about this packet's route and key message level information along with payload data and sets up the routing behavior for all subsequent flits associated with the message. Zero or more body flits follow the head flit, containing the remaining payload of data. The final flit is tail flit which, in addition to containing the last payload, also performs some bookkeeping to close the connection for the message. The header flit and first body flit may be sent in parallel to increase the bandwidth of the system at the expense of more wires. In wormhole flow control, virtual channels are often implemented.

The physical channels are time sliced into a number of independent logical channels called Virtual Channels (VCs). VCs provide multiple independent paths to route packets; however, they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so close that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image of the packet head moving forward toward its destination and the rest of the packet flits following as a worm's body follows the worm head.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies. However, in many related art implementations, all channels are equal in width or number of physical wires. This width can be determined based on the most loaded channel and the clock frequency of various channels.

NoCs can be implemented to enable communication between one or more clusters or chiplets. However, since most clusters/chiplets are often sparsely connected and require all agents within a first cluster to communicate with any agents in a second cluster through a common bridge, such bridges are susceptible to congestion. While having multiple bridges between two clusters can alleviate congestion in some circumstances, existing clusters/chiplets do not have mechanisms to balance the load and prevent congestion in the bridges. Further, the routes utilized for inter-cluster communications are often predetermined, and not optimized/optimizable for transporting packets with minimal latency and congestion. Hence, there is a need for a solution for load balancing inter-cluster communications.

SUMMARY

Aspects of the example implementations of the present disclosure are directed towards a method for load balancing on flows of a Network on Chip (NoC). The method includes receiving packets at the NoC, the packet being associated with a target destination as specified by a cluster identifier and a local identifier. For receipt of each packet, the method includes routing the packet to a destination in the NoC according to the local identifier for the NoC having a same cluster identifier as the cluster identifier associated with the packet, and routing the packet according to a route lookup from referencing the cluster identifier and a path identifier associated with the packet for the NoC having a different cluster identifier from the cluster identifier associated with the packet.

Aspects of example implementations of the present disclosure are also directed to a Network on Chip (NoC) having a plurality of routers and a plurality of bridges arranged into a plurality of clusters. The plurality of bridges is configured to receive packets at the NoC, the packet being associated with a target destination as specified by a cluster identifier and a local identifier. For receipt of each packet, the plurality of bridges routes the packet to a destination in the NoC according to the local identifier for the NoC having a same cluster identifier as the cluster identifier associated with the packet, and route the packet according to a route lookup from referencing the cluster identifier and a path identifier associated with the packet for the NoC having a different cluster identifier from the cluster identifier associated with the packet.

BRIEF DESCRIPTION OF THE DRAWINGS

FIG. 4(b) illustrates a second table that associates routes with cluster identifiers and path identifiers, in accordance with an example implementation.

DETAILED DESCRIPTION

Figure 1A:
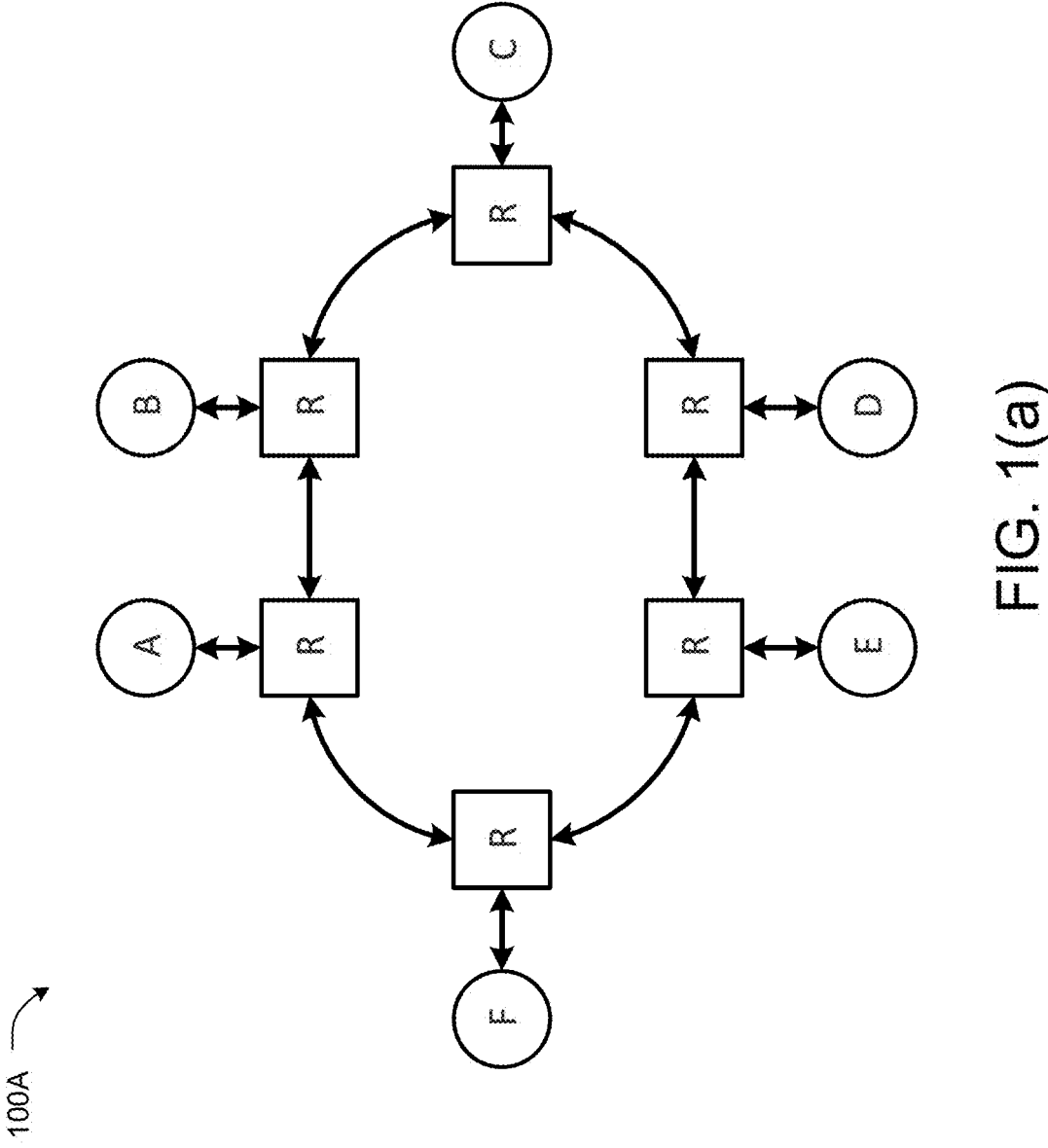
FIGS. 1(a) and 1(b) illustrate examples of Bi-directional ring and 2D Mesh Network-on-Chip (NoC) topologies.
Figure 1B:
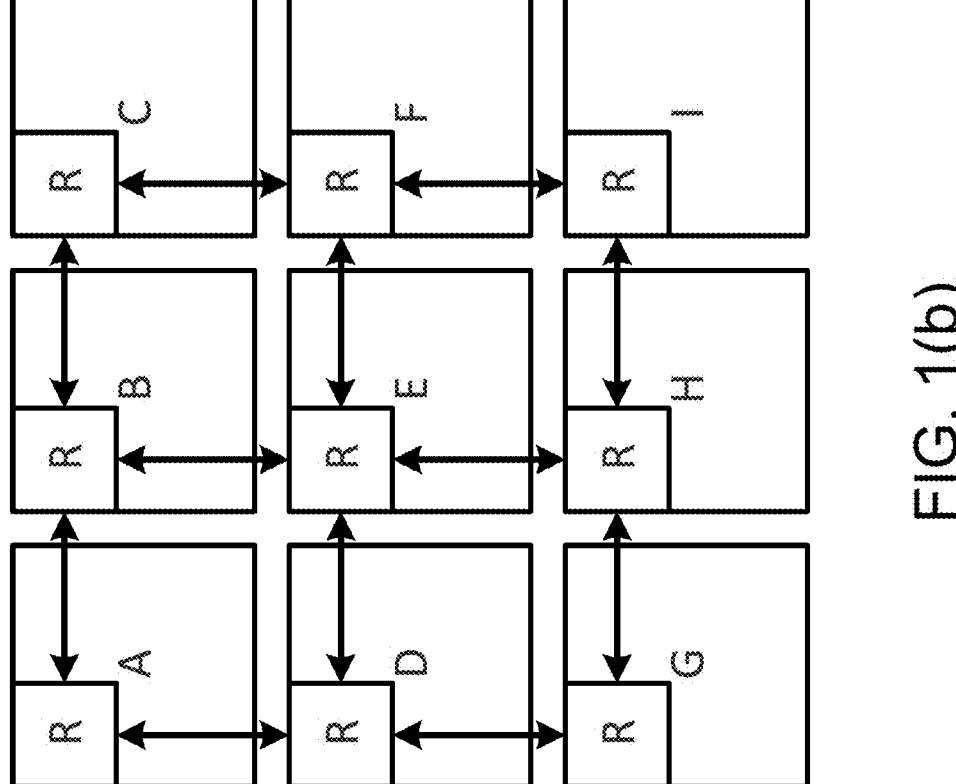
Figure 2:
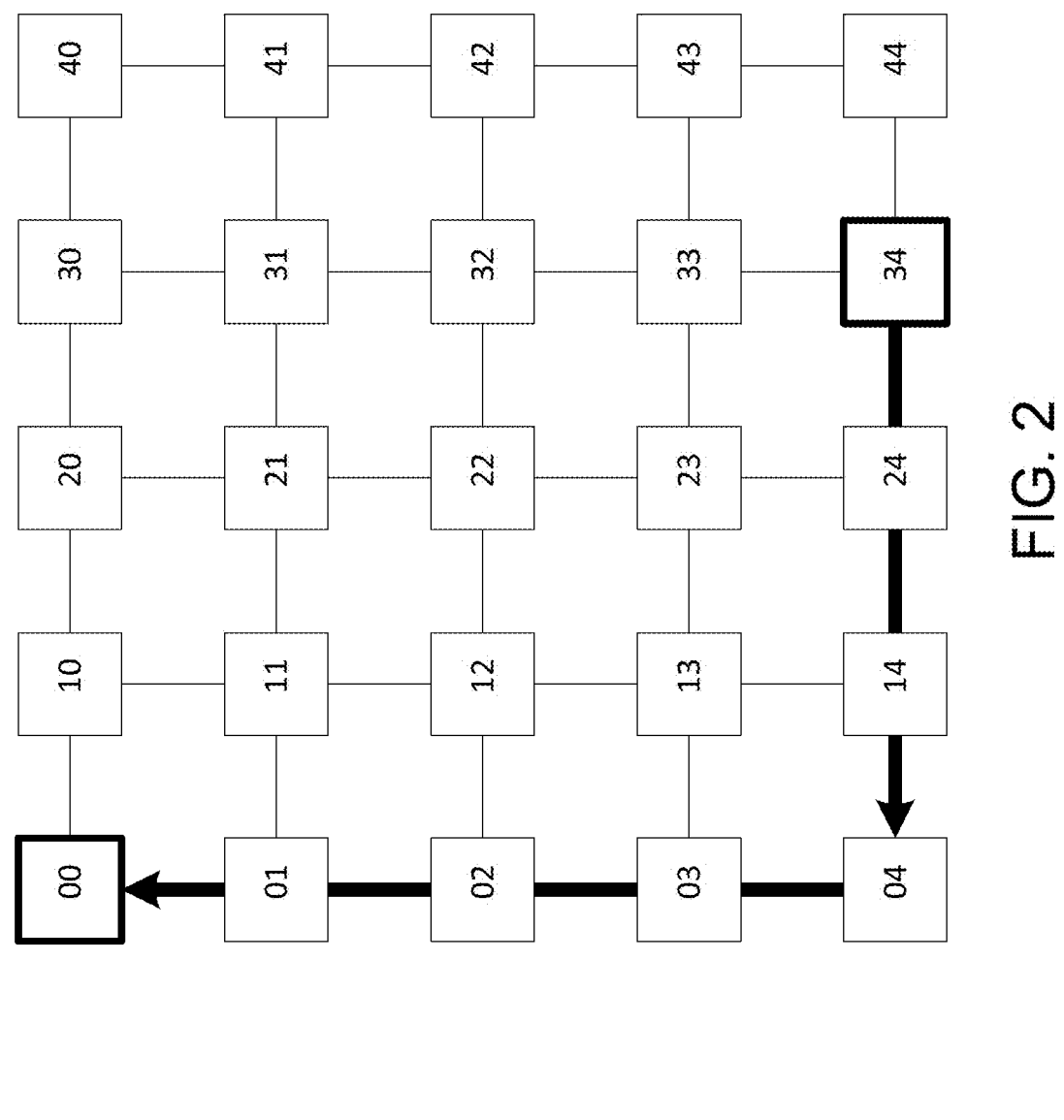
FIG. 2 illustrates an example of XY routing in a related art two-dimensional mesh.

The following detailed description provides further details of the figures and example implementations of the present disclosure. Reference numerals and descriptions of redundant elements between figures are omitted for clarity. Terms used throughout the description are provided as examples and are not intended to be limiting.

Network-on-Chip (NoC) can be adapted to facilitate communication between one or more chiplets or clusters. Each of the clusters is associated with one or more agents indicative of processing elements, memory elements, and the like. Bridges and routers in the NOC fabric enable communication between the agents. The clusters can be independently designed and/or independently constructed. For example, each cluster may be interconnected with its own internal topology such that it can be independently designed, verified (for compatibility among others), and constructed, without requiring details or compatibility verifications with other (non-neighboring) clusters, thereby allowing for design reuse, among other advantages. Each of the clusters can have strong boundaries, i.e., clusters may not require details (such as internal routing information, for example) of other clusters that are not connected thereto during designing thereof. NoCs can be integrated with multiple clusters/chiplets to allow for intra-cluster and inter-cluster communication between agents thereof.

Since each of the clusters is intended to be independently designed, each of the clusters typically has fewer boundary bridges, i.e., bridges that connect one cluster to another. Due to the reduced number of boundary bridges, and due to requiring all agents in one cluster to share the same boundary bridges for transmitting packets to any agent in any other cluster, load balancing is required to prevent or avoid congestion and efficiently/maximally utilize the bandwidth of the bridges. Further, existing mechanisms for inter-cluster communication require inefficiently maintained tables of routing information. Such tables occupy a significant amount of space, which can be better utilized for other purposes. Additionally, existing tables provide limited programmability, thereby making them unsuitable for situations requiring flexibility, such as when routes have to be reassigned due to changes in design or arrangements of the clusters.

Figure 3:
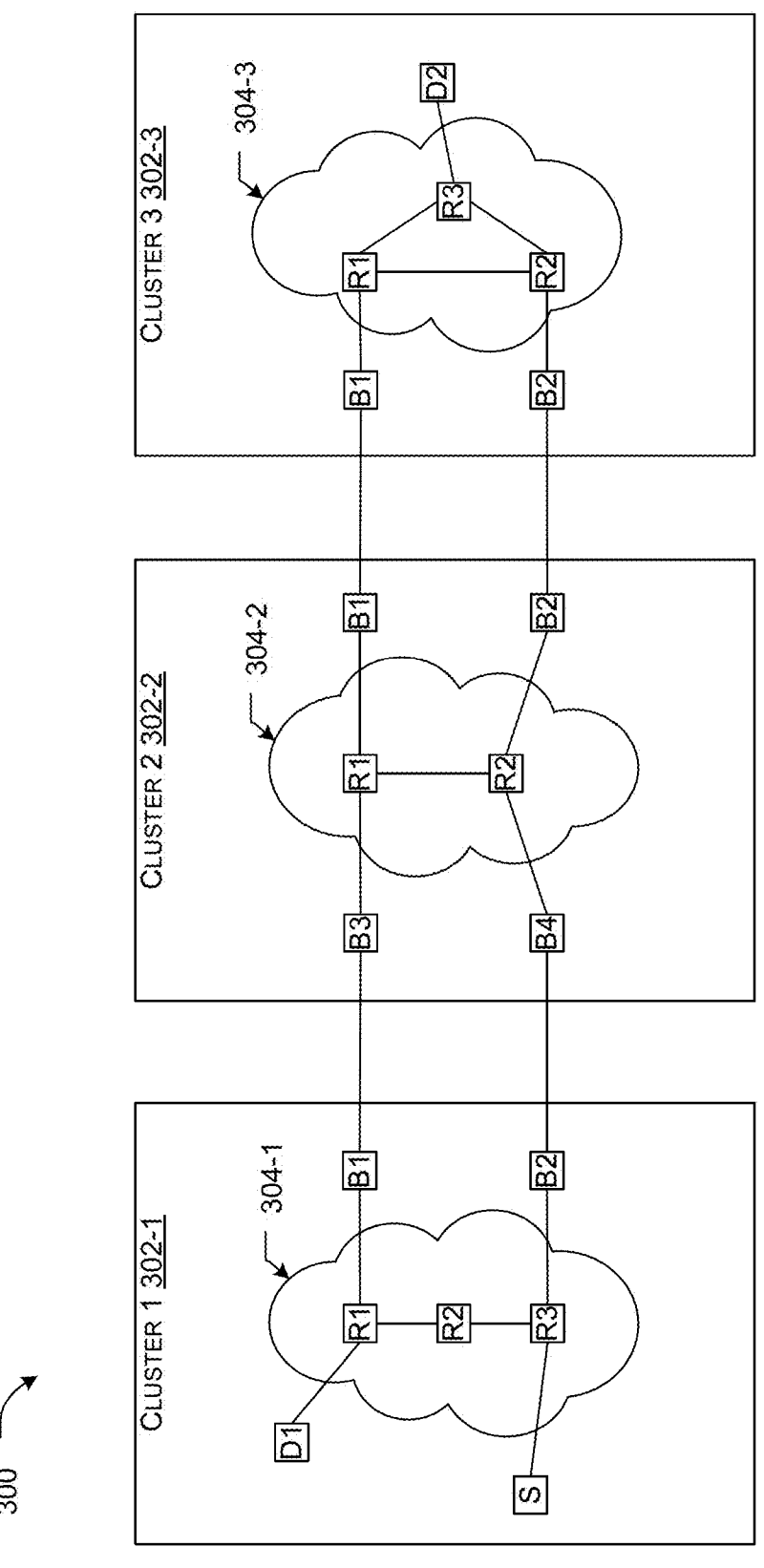
FIG. 3 illustrates a schematic representation of one or more clusters communicating with each other using a NoC.

FIG. 3 illustrates an example representation 300 of inter-cluster communication between one or more clusters connected by the NoC. As shown, the NoC allows communication between multiple clusters, such as clusters 302-1, 302-2, and 302-3 (collectively referred to as clusters 302). The NoC fabric is split across the clusters 302, in that each of the clusters 302 includes at least one of routers R1, R2, or R3, and at least one boundary bridge that allow agents and the routers to communicate with each other. Each cluster 302 may arrange the routers in different topologies, as illustrated in clusters 302-1, 302-2, and 302-3 of FIG. 3. The topologies of the bridges and the routers (and their connection to agents) in each of the clusters 302 may be same or different, and independently designed and constructed. Further, the clusters 302 also include at least one of bridges B1, B2, B3, or B4 (collectively referred to as boundary bridges). Additionally, while FIG. 3 shows the clusters 302 arranged in a partial mesh, the arrangement/topology of the clusters 302 is not limited thereto.

The boundary bridges and partial fabric 304-1, 304-2, 304-3 within the respective clusters 302 collectively form the NOC fabric. The NoC fabric allows for inter-cluster communication by supporting flow of packets between two or more clusters. The NoC fabric enables a source (agent), such as source S, to transmit packets to one or more destinations (agents), such as destinations D1 and D2. The destinations and the source may be within the same cluster, such as when D1 and S are in cluster 302-1, or within different clusters, such as when D2 is in cluster 302-3 and S is in cluster 302-1. The source and destinations are uniquely identifiable using an identifier (ID) having a cluster ID and a local ID. The cluster ID indicates the cluster that an agent belongs to, while the local ID indicates the position of the agent within the cluster. The ID may be represented using a string of bits and may be provided in the packet being transmitted (such as in the header thereof).

The source, on determining the destination to which the packet has to be sent to, may determine if the destination is local to the source, i.e. by determining whether their cluster IDs match. If the cluster ID of the destination (such as destination D1) matches to that of the source (such as source S), the source may perform a look up for a route from the source to the destination in a first table and direct the packet toward the destination through the routers (such as routers R1, R2, and R3 in cluster 302-1). The first table (as described in reference to FIG. 4(*a*)) includes routing information associated with routes from the source to each agent within its cluster. The route from the source to the destination may be identified based on the local ID of the destination.

In some existing implementations, when the destination is in a different cluster than the source (such as when destination D2 is in cluster 302-3 and source S is in cluster 302-1), the source uses the cluster ID to perform a look up on a second table for a route from the source to a boundary bridge connecting to a destination cluster (being the cluster having the destination) or an intermediate cluster closest to the destination cluster from the source cluster (being the cluster having the source). For example, the cluster 302-2 may be the intermediate cluster when cluster 302-1 is the source cluster and cluster 302-3 is the destination cluster. The packet is accordingly routed to the appropriate boundary bridge and ejected out from the cluster, and received either by the intermediate cluster or the destination cluster. Each of the clusters that receives the packet may compare its cluster ID with the cluster ID provided in the packet, and accordingly, either route the packet to the appropriate boundary bridge for ejection or to the intended destination agent.

In such arrangements, however, the same boundary bridges are used for transmitting packets from the source to any agent in the destination cluster. Since the boundary bridges are shared, they are susceptible to congestion during inter-cluster communication, and/or may lead to underutilization of bandwidth provided by the boundary bridges. Additionally, routes stored in such tables are often static and are not dynamically adjusted based on the load, bandwidth availability, or congestion state across the fabric. Existing solutions do not provide for efficient means for balancing loads across the boundary bridges of a cluster. Hence, a method for load balancing is needed that avoids congestion and increases utilization of the boundaries, among other problems.

Embodiments of the present disclosure overcome at least the aforementioned problems, by providing a method and a NoC that utilizes a path ID to look up routes from a table that indexes the routes using a combination of the path ID and the cluster ID when the destination and the source are not in the same cluster.

As stated, the NoC has a plurality of routers and a plurality of bridges arranged into a plurality of clusters, such as in the NoC shown in FIG. 3. In some embodiments, the NoC (or a cluster thereof) receives a packet from a source agent at the corresponding bridge. In other embodiments, the packet may be received from another NoC/cluster thereof from a boundary bridge. The packet is associated with a target destination as specified by a cluster ID and a local ID. In some embodiments, the source may provide the cluster ID and the local ID to the boundary bridge. In other embodiments, the cluster ID and the local ID may be derived from internal information (e.g., address) in the packet at the boundary bridge.

Figure 4A:
FIG. 4(a) illustrates a first table that associates routes with local identifiers.

For each packet received at the bridge, the bridge compares the cluster ID of the cluster it belongs to with the cluster ID associated with the packet. For the NoC/cluster having a same cluster ID as the cluster ID associated with the packet, the packet is routed to the target destination in the NoC according to the local ID associated with the packet. To route the packet to the target destination, the bridge may perform a look up from a first table. An example of the first table 400A is shown in FIG. 4(*a*). As shown, the first table 400A uses the local ID to index possible local routes/routing information (such as local routes 0 to N) from the bridge to other agents within the cluster/NoC. The routing information may include Virtual Channel (VC) IDs, layer IDs in case the NoC has multiple layers, miscellaneous bits, and the like. The packet is routed to the destination using the routing information. For example, if the source S initiates a packet transmission to destination D1, where both source S and destination D1 are in the same cluster 302-1, the bridge that receives the packet from the source S performs a look up for a route between the source S and the destination D1, and routes the packet through the partial fabric 304-1 towards D1 (such as from source S to destination D1 through routers R3, R2, and R1). In other embodiments, the NoC may be configured to transmit the packet to the destination using a route returned from a register circuit, where said register circuit is adapted to retrieve a route in response to providing the local ID as input. The register circuit may be implemented similar to register circuit 400C of FIG. 4(*c*).

For the NoC/cluster having a different cluster ID from the cluster ID associated with the packet, the packet is routed according to a route look up from referencing the cluster ID and a path ID associated with the packet. In some embodiments, the path ID may be represented with one or more bits. For example, the path ID may have a two-bit representation. The path ID may be provided to the bridge of the NoC/cluster through either the source or boundary bridges of other clusters. For example, the source S injects a packet to be transmitted to destination D2 through a corresponding boundary bridge, the source S may provide the path ID to said bridge. The bridge then performs a route look up using the cluster ID and the path ID since source S and destination D2 belong to different clusters (i.e., cluster 302-1 and cluster 302-3, respectively). The packet may then be ejected to the cluster 302-2 through a boundary bridge connecting the cluster 302-1 thereto. When the packet bound for the destination D2 is ejected from the cluster 302-1 through the boundary bridge (such as bridge B1 or B4 in cluster 302-1), a receiving boundary bridge (such as the bridge B3 or B4) in cluster 302-2 receives the packet. On receiving the packet, the bridge B3 or B4 performs a look up for a route referencing the cluster ID and the path ID associated with the packet, since the destination D2 does not belong to the cluster 302-2.

Further, the path ID can be determined statically or dynamically. In embodiments where the path ID is static, the path ID may be determined based on distribution of packet through each of the boundary bridges. In such embodiments, routes may be assigned to each pair of cluster ID and path ID such that the load on each of the boundary bridges is in balance. In other embodiments where the path ID is determined dynamically, the path ID may be generated based on identifiers associated with the source and the destination, congestion and load states among other parameters associated with the NoC, and the like.

In some embodiments, the path ID may be transmitted to the NoC/bridge from the source or source cluster that transmitted the packet. The path ID may be sent through the packet, or through other packetized or non-packetized wiring signals. In some embodiments, the source may be configured to determine the path ID based on the state of the NoC fabric. In some embodiments, the source may use heuristics to approximate the state of the NoC fabric for path ID generation.

In other embodiments, the path ID may be generated/computed by the bridge of the NoC/cluster for the packet. The path ID can be generated from a hash derived from bits of the packet. Further, the path ID may also be generated from a hash of an address in the packet. The path ID may also be generated from a hash derived from an ID of the source transmitting the packet and an ID of the target destination. In some examples, the path ID may be a hash derived from payload information. Deriving the path ID from the packet contents can make debugging easier as the path ID is reproducible when events are replayed.

The path ID may also be generated based on load feedback from the NoC. For example, if routes along B1 of cluster 302-1 are congested, then the path ID may be determined such that the packet is routed through routes along B2 of cluster 302-1 to balance the load between B1 and B2. In some embodiments, the path ID may be generated based on local load tracking or local outstanding tracking. For example, if the source expects a response from the destination for each packet transmitted thereto (such as when retrieving data from memory elements), the bridges of the NoC track the number of outstanding requests, i.e. packets for which a response is outstanding from the destination, that are using each path ID. If the number of outstanding requests exceeds a threshold, then routes along said path are avoided. In such examples, congestion can be caused in one of the boundary bridges due to one or more of the sources routing the packets along said boundary bridge concurrently. The congestion can be detected and a path ID is determined that avoids the congested boundary bridge.

In some embodiments, the path ID may be generated based on a counter. In some embodiments, the path ID may be selected based on round-robin mechanism. For example, a route along a first boundary bridge may be selected for a first packet and every third packet thereafter (i.e. $1^{st}$ and $4^{th}$, $7^{th}$, $10^{th}$ packets, and so on), a second boundary bridge for a second packet and every third packet thereafter (i.e. $2^{nd}$ and $5^{th}$, $8^{th}$, $11^{th}$ packets, and so on), and a third boundary bridge for a third packet and every third packet thereafter (i.e. $3^{rd}$ and $6^{th}$, $9^{th}$, $12^{th}$ packets, and so on), thereby balancing the load between the first, second, and third bridges. Any combination of the aforementioned techniques may be used to generate the path ID.

In some embodiments, the path ID may be generated at the source or the source bridge, and reused throughout the transmission of the packet to the destination. In other embodiments, the path ID may be regenerated each time the packet is injected into a new cluster. For example, the packet to be transmitted to the destination in cluster 302-3 may be associated with a first path ID when injected into the NoC at the cluster 302-1. When the packet is ejected from the cluster 302-1 and injected into the cluster 302-2 through its boundary bridge (such as bridge B3), the boundary bridge generates a new path ID, thereby allowing the route of the packet to be dynamically and flexibly determined.

In some embodiments, the NoC/bridge may perform a route look up by referencing a second table 400B as shown in FIG. 4(b). The second table 400B is a predefined look up table that associates a unique route with every combination of cluster ID and path ID. For example, if there are N−1 clusters (such as 16 clusters, for example) in an NoC, and the path ID is represented using M bits (such as two bits, for example), then the predefined lookup/second table 400B may have NM entries (i.e. 64 entries in the foregoing example), where one route is associated with each of the 64 combinations of cluster ID and path ID. Each route may provide a path from the bridge receiving the packet (whether from the source or from boundary bridge of another cluster) to a boundary bridge wherefrom the packet can be ejected to another cluster that has the destination or is closer to the destination cluster. For example, the source S may inject a packet bound for destination D2 through a boundary bridge, which on determining that the destination D2 is not in the same cluster as the source S, performs a look up on the second table using the cluster ID and the path ID associated with the packet. The look up yields a route from the bridge that receives the packet to a boundary bridge (such as boundary bridge B1 or B2 of cluster 302-1), wherefrom the packet is ejected to cluster 302-2, since cluster 302-2 is the closest cluster to the destination cluster (being cluster 302-3) from the source cluster (being 302-1). Boundary bridge B3 or B4 of the cluster 302-2 receives the packet from the cluster 302-1. When the boundary bridge B4 in cluster 302-2 receives the packet to be sent to destination D2 from the cluster 302-1, and when the boundary bridge B4 determines that the destination D2 does not correspond to the cluster 302-2, the boundary bridge B4 performs a look up for a route from the bridge B4 to another bridge (such as B1 or B2) within the cluster 302-2, from which the packet can be ejected to the destination cluster 302-3. Either boundary bridge B1 or B2 may be selected based on the path ID provided to the boundary bridge B4. Cluster 302-3 receives the packet through either of its bridges B1 or B2 from the cluster 302-2. On determining that cluster ID of the packet matches that of the cluster 302-3, thereby indicating that the cluster 302-3 has the destination, the packet is routed to the destination.

While use of the second table 400B may allow the routes to be selected based on the cluster ID and the path ID in a manner that allows load to be balanced across the boundary bridges of each cluster, the size of the second table 400B grows quadratically. The number of entries in the second table 400B is equivalent to the product of number of clusters and possible path IDs. Furthermore, the routing information is duplicated in multiple entries, as different combinations of cluster IDs and path IDs can be associated with the same route.

Figure 4C:
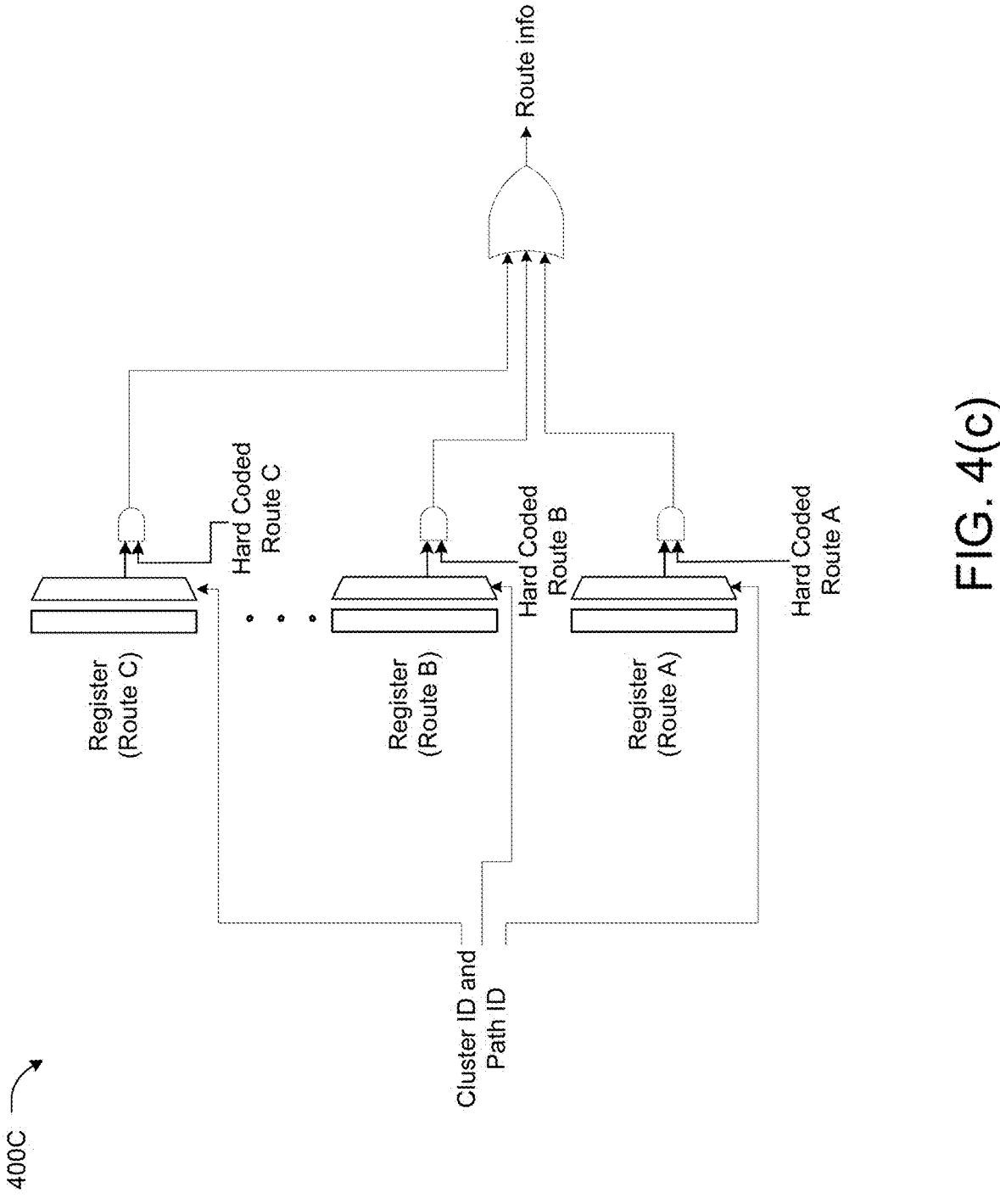
FIG. 4(c) illustrates a schematic representation of register circuits that output routing information based on cluster identifiers and path identifiers, in accordance with an example implementation.

In some embodiments, to further optimize routing table (s), the routing information may be related to a collection of register circuits, such as register circuits 400C shown in FIG. 4(c). While FIG. 4(c) shows the register circuit 400C having 3 route registers (with each route register corresponding to routes A, B, and C), it may be appreciated by those skilled in the art that the register circuit 400C may be adapted to include any number of registers corresponding to the number of routes. The register circuits 400C are configured to receive the target destination (or IDs associated therewith) and the path ID to output a corresponding route in response thereto, based on which the packets may be routed. The register circuits 400C may include one or more route registers (viz. route registers A, B, and C), each represented by a bit vector. The bit vectors may be organized such that each bit is associated with a specific value/ combination of cluster ID and path ID, and exactly one of the registers has a '1' bit for each combination of cluster ID and path ID. The register that has a '1' for a corresponding cluster ID and path ID combination identifies the route that should be taken for packets going to that cluster ID associated with that path ID. The cluster ID and the path ID may be used to select the route through which the packet is to be transmitted. The cluster ID and the path ID are used to control which bit of the register bit vectors is selected and used to include or exclude that register's route information from the output of the circuit. For example, if the number of clusters is 16 and the path ID is represented using two bits, a collection of combinations of cluster ID and path ID associated with a route may be represented using a bit vector of size 64. The least significant bit of this register may be associated with cluster ID 0 and path ID 0, and the next three bits associated with cluster ID 0 and path IDs 1-3. Then, the next 4 bits may be associated with cluster ID 1 and path IDs 0-3.

The incoming cluster ID and path ID are used to select the route by using a multiplexer (MUX). The MUX receives the bit vector as input and uses the cluster ID and the path ID associated with a packet to be transmitted as selectors to output a bit indicating whether the route corresponding to the route register is to be used to transmit the packet. The bit is then AND-ed with corresponding hard-coded route information using an AND logic gate. When the bit is affirmative (i.e., has a value of 1 or is True) for a route register, the corresponding route information is enabled. In such instances, the AND gate returns the corresponding routing information. When the bit is negative (i.e., has a value of 0 or is False) for a route register, the routing information associated with that register is not output. In such instances, the AND gate returns a null (all 0) value. The outputs of each of the AND gates may be OR-ed to retrieve the final routing information from the register whose bit-vector was affirmative at the necessary position. The register circuit 400C is arranged such that only one route information is enabled or retrieved, indicating that only one route is returned for a given combination of cluster ID and path ID. The OR gate may return only those routing information that have been enabled. The routing information is then used to route the packet toward the destination, by transmitting the packet to a boundary bridge that is connected either to a cluster closer to the destination, or to the destination cluster itself.

The number of route registers may be smaller in comparison to the size of the second table 400B. Further, the register circuits 400C eliminate the need for duplicating the routing information.

The register circuits 400C are (re) configurable. The register circuit 400C is able to be reprogrammed to have any route to use the boundary bridge. For example, if the clusters are reconfigured to connect to each other differently (for example, if the clusters 302-1 and 302-3 switch locations), then the register circuit 400C can be reprogrammed by changing corresponding entries in the registers such that a different route is selected for the same cluster ID and path ID pair. In such examples, values/entries in corresponding registers may be changed in accordance with the global system assembly that the cluster needs to be configured to take part in. In some implementations, straps or fuses can be used to configure the registers. The straps/fuses can be built into the chiplets when they are placed on the silicon die. The straps/fuses can control the reset values of registers or may substitute for programmable registers and provide a fixed value to the decoding MUXs. For example, fuses are intentionally blown to encode a pattern of bit values. Blowing the fuses may alter/encode the pattern in a manner that normal usage cannot alter. The fuse patterns can be set differently for each chip after manufacturing. As the number of these strap bits to be set in a design may be large, dedicating fuses to each can be expensive. Having fuses control the input of a circuit that drives these reset values will allow a small number of fuses to control many of these bits at the cost of limiting the number of possible reset values.

In other embodiments, values can be read and written into the registers using software/computer-executable instructions, such as through use of a control layer. The control layer may include a controller (being a processing element configured to execute a set of processor executable instructions) that modifies the values in the registers based on requirements. The software reads and executes instructions stored in an external memory, such as a Read-Only Memory (ROM). Execution of the instructions can set the registers to have the desired values therein. The registers, hence, provide increased flexibility in terms of programmability. Further, the registers eliminate the need for synthesis compression and duplication of routing information.

Figure 5A:
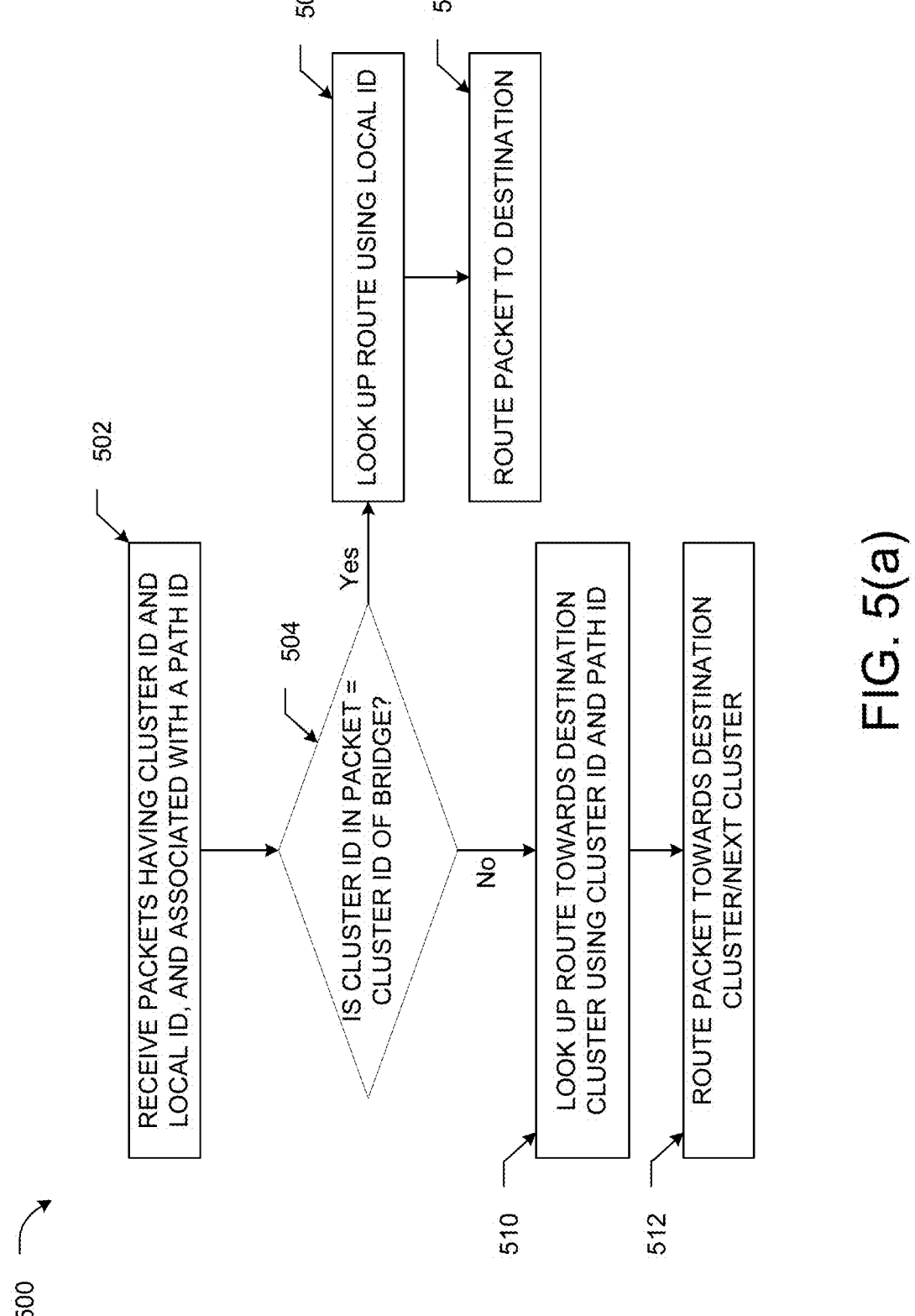
FIG. 5(a) illustrates a flowchart of a method for load balancing inter-cluster communication, in accordance with an example implementation.
Figure 5B:
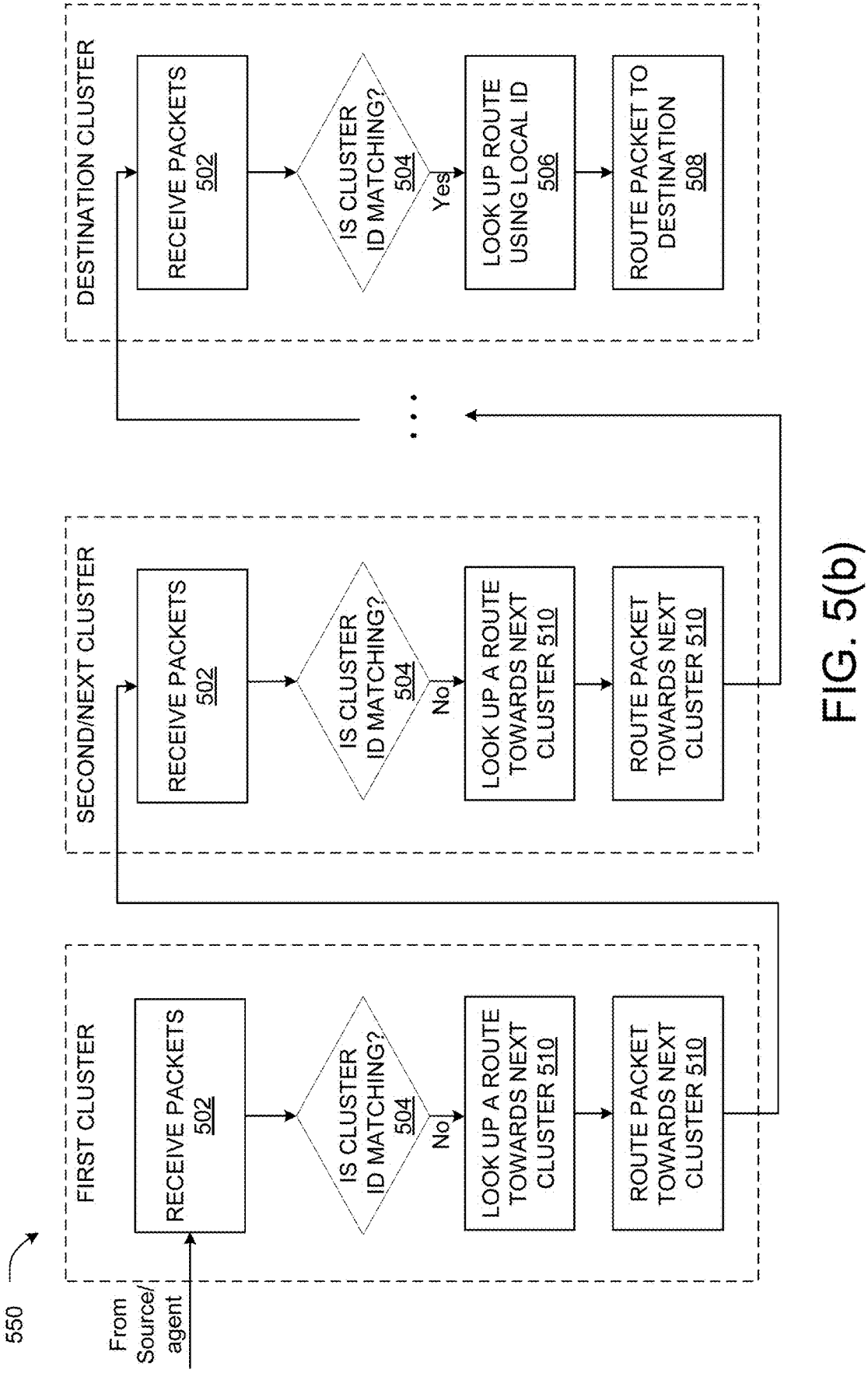
FIG. 5(b) illustrates a flow diagram of the method being performed in one or more clusters, in accordance with an example implementation.

FIG. 5(a) illustrates a flowchart of a method 500 for load balancing inter-cluster communication, in accordance with an example implementation. As shown, at step 502, the method 500 includes receiving packets at the NoC (or a first cluster thereof), the packet being associated with a target destination as specified by a cluster identifier and a local identifier. At step 504, for receipt of each packet, the method 500 includes determining if the NoC/first cluster has a same cluster identifier as the cluster identifier associated with the packet. If yes, the method 500, at step 506, includes performing a look up for a route using the local identifier, and proceeds to step 508 where the packet is routed to a destination in the NoC according to the local identifier. If no, the method 500, at step 510, includes performing a route look up for a route towards a destination cluster (i.e. the cluster to which the target destination belongs). The look up at step 510 identifies a path/route from the first cluster to the destination cluster (if the destination cluster is adjacent or one hop away from the first cluster), or to a second/next cluster (that is closer to the destination cluster than the first cluster) through corresponding boundary bridges. The method 500 then proceeds to step 512 where the packet is routed to a boundary bridge of the first cluster according to the route looked up. As depicted in flow diagram 550 of FIG. 5(*b*), the steps 502, 504, 510, and 512 may be iterated by the NoC (at a bridge of first and next clusters) until the packet reaches the destination cluster, where the destination cluster (at a bridge thereof) may perform steps 502, 504, 506, and 508 of the method 500. The bridge of the first cluster may receive the packet from the source/agent, and the bridge of the next clusters may receive the packet from a previous cluster (such as the first cluster being a previous cluster to the second cluster). While FIG. 5B depicts 1 'next cluster', it may be appreciated by those skilled in the art that there may be zero or more next clusters between the first cluster and the destination cluster.

Figure 6:
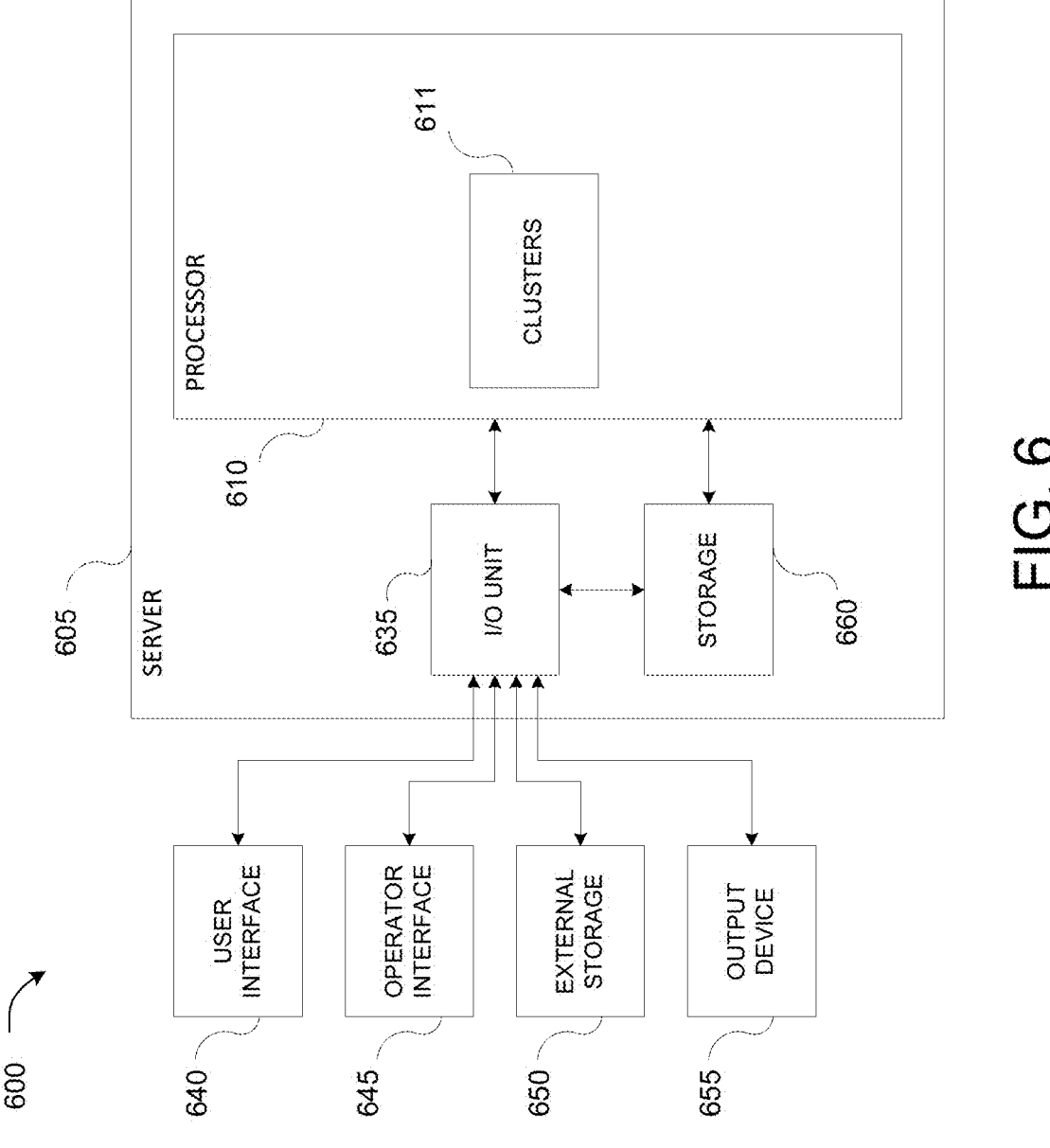
FIG. 6 illustrates a computer/server block diagram upon which the example implementations described herein may be implemented.

FIG. 6 illustrates an example computer system 600 on which example embodiments of the present disclosure may be implemented. The computer system 600 includes a computing unit/server 605 which may involve an I/O unit 635, storage 660, and a processor 610 operable to execute one or more units as known to one of skill in the art. The term "computer-readable medium" as used herein refers to any medium that participates in providing instructions to processor 610 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 640 and operator interfaces 645 which may utilize input devices such as a keyboard, mouse, touch device, or verbal command.

The server 605 may also be connected to an external storage 650, which can contain removable storage such as a portable hard drive, optical media (CD or DVD), disk media or any other medium from which a computer can read executable code. The server 605 may also be connected an output device 655, such as a display to output data and other information to a user, as well as request additional information from a user. The connections from the server 605 to the user interface 640, the operator interface 645, the external storage 650, and the output device 655 may via wireless protocols, such as the 802.11 standards, Bluetooth® or cellular protocols, or via physical transmission media, such as cables or fiber optics. The output device 655 may therefore further act as an input device for interacting with a user.

The processor 610 may include one or more clusters 611. The clusters 611 may be connected through a NoC. The clusters 611 implement the method 600 for load balancing during inter-cluster communication.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Moreover, other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A method for load balancing flows of a Network on Chip (NoC), comprising:

upon receipt of a packet at a bridge of the NoC, the packet associated with a target destination as specified by a cluster identifier and a local identifier:

when the bridge of the NoC having a same cluster identifier as the cluster identifier associated with the packet, routing the packet to the target destination in the NoC according to the local identifier; and when the bridge of the NoC having a different cluster identifier from the cluster identifier associated with the packet, routing the packet according to a route lookup from referencing the cluster identifier and a path identifier associated with the packet, wherein the path identifier is used to select a sequence of inter-cluster bridges from a plurality of possible sequences of inter-cluster bridges used to route the packet to the target destination.

2. The method of claim 1, wherein the path identifier is transmitted to the NoC from a source that transmitted the packet.

3. The method of claim 1, wherein the path identifier is generated by a bridge for the packet.

4. The method of claim 3, wherein the path identifier is generated based on a counter.

5. The method of claim 3, wherein the path identifier is generated from an address hash of an identifier of the target destination.

6. The method of claim 3, wherein the path identifier is generated from a hash derived from an identifier of a source transmitting the packet and an identifier of the target destination.

7. The method of claim 3, wherein the path identifier is generated from a hash derived from bits of the packet.

8. The method of claim 3, wherein the path identifier is generated based on load feedback from the NoC.

9. The method of claim 3, wherein the path identifier is generated based on local load tracking or local outstanding tracking.

10. The method of claim 1, wherein the routing the packet according to the route lookup from referencing the cluster identifier and the path identifier associated with the packet comprises referencing a pre-defined lookup table that associates a route with the cluster identifier and the path identifier.

11. The method of claim 1, wherein the routing the packet according to the route lookup from referencing the cluster identifier and the path identifier associated with the packet comprises inputting the target destination and the path identifier into register circuits configured to output a route in response to the input.

12. The method of claim 11, wherein the register circuits are configurable.

13. A Network on Chip (NoC), comprising:

a plurality of routers and a plurality of bridges arranged into a plurality of clusters;

wherein each of the plurality of bridges is configured to:

upon receipt of a packet at a bridge of the plurality of bridges of the NoC, the packet associated with a target destination as specified by a cluster identifier and a local identifier:

when the bridge of the plurality of bridges of the NoC having a same cluster identifier as the cluster identifier associated with the packet, transport the packet through the plurality of routers to the target destination in the NoC according to the local identifier; and when the bridge of the plurality of bridges of the NoC having a different cluster identifier from the cluster identifier associated with the packet, transport the packet through the plurality of routers according to a route lookup from referencing the cluster identifier and a path identifier associated with the packet, wherein the path identifier is used to select a sequence of inter-cluster bridges from a plurality of possible sequences of inter-cluster bridges used to route the packet to the target destination.

* * * * *